Oct. 16, 1928.

E. SOULLIÈRE 1,687,697

THEFT PREVENTING ROCKING LOCK FOR BICYCLES

Filed Oct. 7, 1926

Edouard Soullière,
By Chatwin + Company.
Attys.

Patented Oct. 16, 1928.

1,687,697

UNITED STATES PATENT OFFICE.

EDOUARD SOULLIÈRE, OF SALON, FRANCE.

THEFT-PREVENTING ROCKING LOCK FOR BICYCLES.

Application filed October 7, 1926, Serial No. 140,176, and in France October 21, 1925.

The invention concerns a quick-acting rocking device, to prevent the theft of any bicycle on which it has been fitted, by effectually locking either the front or the back wheel.

The annexed drawings show a preferred embodiment of the invention, in which.

The rocking lock comprises two small boxes A and B, each formed by cutting or stamping the metal which is afterwards bent so as to have no overlapping parts but the moveable ones.

The small boxes are then bolted, screwed or riveted one on each branch of a front or rear bicycle fork.

The box A contains a small lock of any known automatic catching system, actuated by the moveable piece C placed inside the housing K; a key D acts upon the catch E when it is desired to open the lock.

Figure 2:
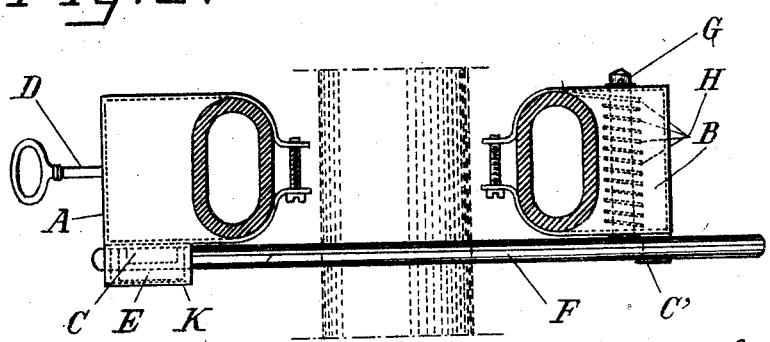
Fig. 2 is a cross section of the fork along the line 1—1 above the lock, showing a plan of said lock.

The box B contains only the recalling device for the locking-rod F, and its fixed stop C'. The lock F is made of a cylindrical rod fitted with an axle G placed perpendicularly on the rod F. This axle bears the (coiled) spring H shewn on Fig. 2 in dotted lines and which is itself fixed at one end on the axle G and at the other end on the side of the box B.

Figure 1:
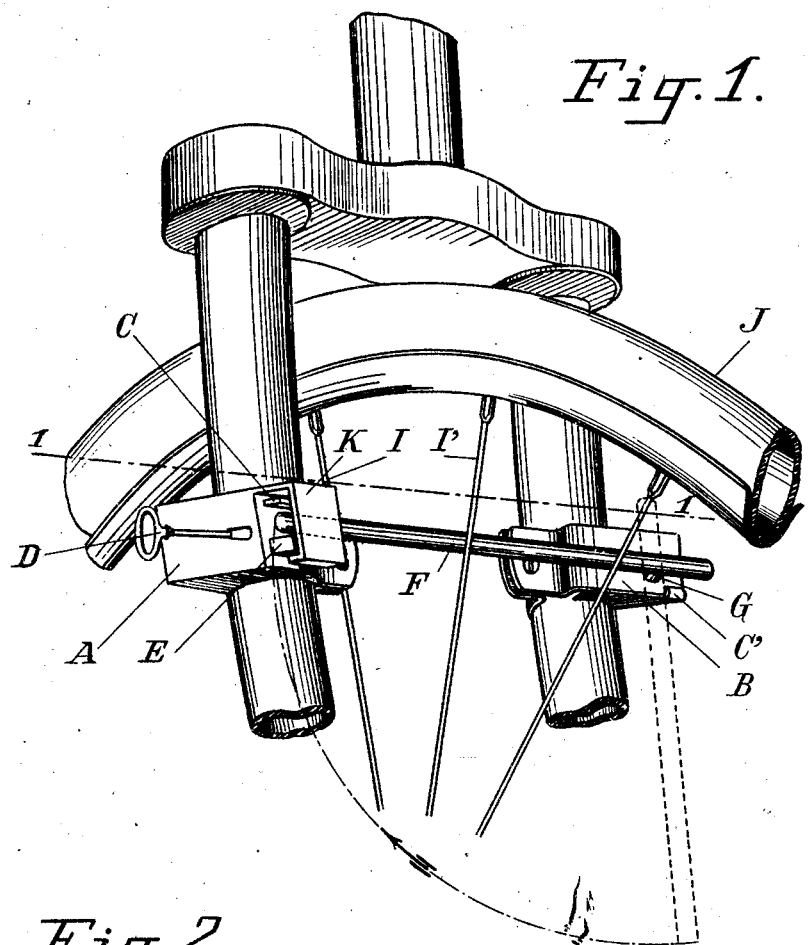
Fig. 1 is a perspective view of the topmost portion of a bicycle front-fork fitted with the rocking lock.

The rocking lock works as follows:

When the bicycle is in use, the lock F occupies, through the action of the spring H, the vertical position shewn on Fig. 1 in dotted lines; it is kept in that position by the fixed stop C'.

When the bicycle is no longer in use, the rod F is raised by hand, swivelling on the axle G, and engaging between two spokes I and I' of the wheel J (in the manner shewn by the arrow); in this motion, the spring H has set itself and the end of the lock F has come against the spring stop C, placed at the top part of the housing K; this contact has automatically caused the release of a spring actuating the catch E, which is pushed out of the box A in the lower portion of the housing K, where it remains further secured by a small ledge; in this position, the lock F is kept securely in the housing K of the box A and the wheel J cannot rotate any longer.

To free the wheel, it is only necessary, with the key D, to bring back, by compressing of the spring actuating it, the catch E, inside the box A. The rod F, thus set free, and urged by the spring H, resumes quickly and automatically its vertical position against the stop C'.

This rocking lock, light yet strong, and sure in its action, enables the cyclist to leave his mount unattended without risk of theft.

I declare that what I claim is:—

In a theft preventing lock for bicycles, the combination of a locking rod, a first box fixed on one of the branches of a fork of the bicycle, said box containing a lock key operated to unlocking position, being closed at its top to protect said lock and open at its bottom to receive one end of said locking rod, a second box fixed on the other branch of said fork, an axle movably mounted in said second box and projecting from the front face thereof having its projecting end fixed to the other end of said locking rod, and a recalling device within said second box to retract said locking rod.

In testimony whereof I have affixed my signature.

EDOUARD SOULLIÈRE.